(12) United States Patent
Ruetenik (10) Patent No.: US 10,375,946 B2
(45) Date of Patent: Aug. 13, 2019

(54) REDUCED WEIGHT EQUINE ORTHOTIC PAD AND METHOD

(71) Applicant: Monty L. Ruetenik, Clear Lake Shores, TX (US)

(72) Inventor: Monty L. Ruetenik, Clear Lake Shores, TX (US)

( * ) Notice: Subject to any disclaimer, the term of this patent is extended or adjusted under 35 U.S.C. 154(b) by 0 days.

(21) Appl. No.: 15/634,080

(22) Filed: Jun. 27, 2017

(65) Prior Publication Data
US 2017/0290317 A1    Oct. 12, 2017

Related U.S. Application Data

(63) Continuation-in-part of application No. 14/046,430, filed on Oct. 4, 2013, now abandoned, which is a
(Continued)

(51) Int. Cl.
| | |
|---|---|
| *A01L 7/02* | (2006.01) |
| *A01K 13/00* | (2006.01) |
| *B29B 7/00* | (2006.01) |
| *B29C 39/00* | (2006.01) |
| *B29C 39/02* | (2006.01) |
| *A01L 15/00* | (2006.01) |
| *A61D 9/00* | (2006.01) |

(Continued)

(52) U.S. Cl.
CPC .............. *A01L 7/02* (2013.01); *A01K 13/007* (2013.01); *A01L 15/00* (2013.01); *A61D 9/00* (2013.01); *A61D 11/00* (2013.01); *B29B 7/005* (2013.01); *B29C 39/003* (2013.01); *B29C 39/02* (2013.01); *B29K 2075/00* (2013.01); *B29K 2105/048* (2013.01); *B29K 2105/16* (2013.01); *B29K 2425/06* (2013.01); *B29K 2995/0091* (2013.01); *B29L 2031/50* (2013.01)

(58) Field of Classification Search
CPC .. A61H 1/0237; A61H 1/0262; A61H 1/0266; A61H 2003/007; A61H 99/00; A01L 7/00; A01L 7/02; A01L 3/06; A01L 3/00; A01L 5/00; A01L 15/00; A01K 13/006; A01K 13/007; B68B 7/00
See application file for complete search history.

(56) References Cited

U.S. PATENT DOCUMENTS

| | | | |
|---|---|---|---|
| 3,882,561 A * | 5/1975 | Hanson | A43B 5/0405 12/142 P |
| 7,409,818 B2 * | 8/2008 | Llewellyn | A01L 11/00 168/4 |

(Continued)

*Primary Examiner* — Colin W Stuart
(74) *Attorney, Agent, or Firm* — Douglas Baldwin; Timothy D. Snowden (57) ABSTRACT

An improved shock absorbing, light-weight, thermally insulative orthotic pad designed for use in a "pad and boot" assembly for hoofed livestock. The pad is comprised of a mixture of small particles incorporated and encased in elastomeric materials. The particles have a lower density than the elastomeric materials and possess better thermally insulative properties. The pad is preferably elliptically shaped when viewed from the top or bottom, may be wedge-shaped when viewed from the side, and may include a triangular projection designed to contact a horse's frog and/or a front projection designed to cushion an animal's toe. The pad may also have side clips and toe bumper.

17 Claims, 6 Drawing Sheets

Related U.S. Application Data continuation-in-part of application No. 13/396,191, filed on Feb. 14, 2012, now Pat. No. 8,656,691.

(60) Provisional application No. 61/481,490, filed on May 2, 2011.

(51) Int. Cl.
| | |
|---|---|
| *A61D 11/00* | (2006.01) |
| *B29K 75/00* | (2006.01) |
| *B29K 105/16* | (2006.01) |
| *B29K 105/04* | (2006.01) |
| *B29K 425/00* | (2006.01) |
| *B29L 31/50* | (2006.01) |

(56) References Cited

U.S. PATENT DOCUMENTS

| | | |
|---|---|---|
| 7,445,051 B2 | 11/2008 | Ruetenik |
| 2004/0058163 A1* | 3/2004 | Gansen ............. C08G 18/4081 |
| | | 428/423.1 |
| 2007/0107389 A1 | 5/2007 | Ruetenik |
| 2009/0032270 A1* | 2/2009 | Ruetenik ............. A01K 13/007 |
| | | 168/28 |
| 2014/0033661 A1* | 2/2014 | Ruetenik ................ B29C 70/66 |
| | | 54/82 |

\* cited by examiner

REDUCED WEIGHT EQUINE ORTHOTIC PAD AND METHOD

RELATIONSHIP TO OTHER APPLICATIONS

This application is a continuation-in-part of and claims benefit of U.S. patent application Ser. No. 14/046,430, filed Oct. 4, 2013 which is a continuation-in-part of Ser. No. 13/396,191, filed Feb. 14, 2012 that claims benefit of Provisional application Ser. No. 61/481,490 filed May 2, 2011, the disclosures and Figures of which are incorporated herein by reference for all purposes.

FIELD OF THE INVENTION

This invention relates to a reduced weight orthotic pad for hoofed animals, and methods for making such pads. More specifically, it relates to an orthotic pad made of particles, preferably spheroids, dispersed in and immovably fixed into an elastomeric gel, such that the orthotic pad's thermal insulation properties are increased, and its weight is reduced, while maintaining or increasing durability and shock absorbing ability.

BACKGROUND

A variety of devices have been developed over the years for both protection and therapy of hoofed animals, particularly equines. One such device, described in U.S. Pat. No. 7,445,051 issued Nov. 4, 2008 and patent publications 2007/0107389, published May 17, 2007 and U.S. 2009/0032270, published Feb. 5, 2009. These describe flexible equine boots, and a shock absorbing orthotic pad designed to be disposed inside and at the bottom of the boot creating a boot assembly. This assembly assists in shock-absorption during transport and stalling and plays an essential therapeutic role in laminitis and other diseases of the hoof and leg. A desirable composition of and process for manufacturing said pads is described in U.S. Pat. No. 7,445,051, issued Nov. 4, 2008.

The significant weight of the current commercial embodiments of the boot and elastomeric pad assemblies described above is a source of concern to some equine owners and veterinarians, particularly regarding the hypothetical negative impact the weight of the pad and boot assembly may have upon the animal's stride.

In addition to the need to reduce the weight of current elastomer gel pads there is a need for boots and pads that will provide additional thermal insulation. Aluminum trailers are increasingly popular as a means of transporting equines, due at least in part to their lower fuel costs and durability. One of the disadvantages of aluminum trailers, however, is high thermal conductivity, particularly of the floor. Because exhibition and performance horses are often transported in the summer months, the heat radiating from the road surface through the trailer floor can be detrimental to a horses' health and performance. Overheating of transported animals results in fatigue which decreases performance—a particular problem for performance and exhibition animals. Currently, the standard practice in summer months, particularly in hot regions, is to transport animals during the night when both ambient temperature and road surface temperature are lower.

Many manufacturers of high quality, modern trailers seek to address the high thermal conductivity of aluminum trailers by offering windows, open doorways, and insulation packages for the trailer roof and sides; however, few, if any, offer insulated floors.

Although air conditioning is one option to prevent overheating during transportation, it does little to reduce the heat conducted through the floor to the horse's feet and legs, making it more effective to directly insulate and cool the feet and legs.

The hard, heavy, rubber mats used for slip prevention on the floors of aluminum trailers have increased the demand for comfortable footing, such as the boot and elastomeric gel pad assemblies previously mentioned. Therefore, increasing the thermal insulation properties of the gel pad would provide an economical and effective method of preventing overheating without resorting to air conditioning and/or thick, heavier cushioning mats in the entire trailer. This invention does just that.

SUMMARY OF THE INVENTION

In broad aspect, this invention is an improved shock absorbing, light-weight, thermally insulative orthotic pad designed for use in a "pad and boot" assembly for hoofed livestock. The pad is comprised of a mixture of small particles incorporated and encased in elastomeric materials. In a preferred embodiment, elastomeric material generally comprises the top portion of the pad, and particles, preferably spheroids, dispersed in a matrix of elastomeric material comprise the bottom portion. The particles have a lower density than the elastomeric materials and possess better thermally insulative properties. In a particularly preferred embodiment, at least some of the particles are comprised of expanded polystyrene (EPS) foam beads. In other embodiments, the pad is elliptically shaped when viewed from the top or bottom, may be wedge-shaped when viewed from the side, and may include a triangular projection designed to contact a horse's frog and/or a front projection designed to cushion an animal's toe. The pad may also have side clip and toe bumper. The pad may be comprised of multiple, generally distinct regions formed of differing elastomeric materials, with at least one region containing particles. Additionally, the pad may be comprised of more than one type of particles, which may be mixed together or separated into generally distinct regions. Particles of a spheroidal or near shape are preferred.

The improved shock-absorbing orthotic pad of this invention provides both reduction in weight and improvements in thermal insulation over current pads, while maintaining essential properties of the boot/pad assembly described in U.S. Pat. No. 7,445,051 (the disclosure of which is incorporated herein by reference) including, the ability to attach a double-sided touch fastener strip to the bottom of the pad to provide rotational stability in the boot, and sufficient depth and elastomeric properties to cushion, massage and support the hoof as desired.

In general, the particles are dispersed in at least one unset liquid elastomeric material during curing and become immovably bound into the polymer after it is cured. The elastomer acts as a binder forming a supportive matrix for the particles and prevents them becoming fused together or "clumped" in the elastomer. The resulting mixture is comprised of elastomer monomers, curing agent, catalyst and particles. This mixture is cast in an open mold in which the open top of the mold corresponds to the bottom of the finished pad. Once cured, the particles are immovably fixed in the cured (solidified) elastomer The final dispersion (dependent upon the speed of dispersion and the tendency of the less dense particles to rise to the top) of the particles in the cured pad is controlled by altering at least one of the following: 1) the amount of catalyst used in formulating the elastomeric material that controls the speed of curing, 2) the duration of mixing of the elastomeric material and/or the mixture of particles and elastomeric material, and 3) the temperature of the components of the elastomeric material before mixing. In another embodiment, the particles are dispersed in the body of the orthotic pad, but not in the side clips, toe bumper or frog support. In another preferred embodiment, a hook-and-loop type fastener system is embedded in the elastomeric material prior to curing.

DETAILED DESCRIPTION OF THE INVENTION

This invention is a flexible, cushioning, shock-absorbing orthotic pad for equine boots with low thermal conductivity and low weight per volume, and, in one embodiment, a process for making such pads by dispersing small particles, preferably spheroidal in shape, in one or more elastomeric materials. In broad aspect, the pads of the invention are comprised of a mixture of small particles and gel-like, elastic materials designed to be placed inside and at the bottom of an animal boot so as to be positioned beneath the animal's hoof when the boot is in use.

In preferred embodiments, the particles are dispersed in the lower two thirds of the elastomeric pad. The top portion provides a durable, elastic surface for the equine hoof, while the particles in the bottom portion increase thermal insulation and decrease total weight of the pad. The particles are comprised of a polymer material, and are preferably expanded foam or other cellular material, and are of a size conducive to dispersion in the elastomer(s) of the pad to create a strong matrix of dispersed particles in the elastomer.

Suitable elastomeric pads (to be modified by addition of low density particles) and boots including suitable materials, are described in U.S. Pat. No. 7,445,051 issued Nov. 4, 2008 and previous patent publications U.S. 2007/0107389, published May 17, 2007 and U.S. 2009/0032270, published Feb. 5, 2009. These relate in part to a completely elastomeric pad as part of an equine pad and boot assembly, and the relevant Figures and disclosures describing an elastomeric pad are incorporated herein by reference.

Figure 1:
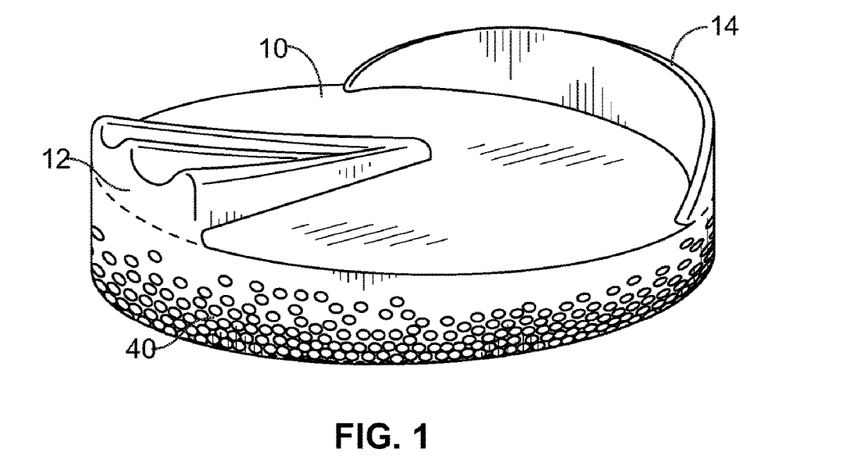
FIG. 1 is an isometric of a pad showing particles embedded, which is an embodiment of the invention.
Figure 2:
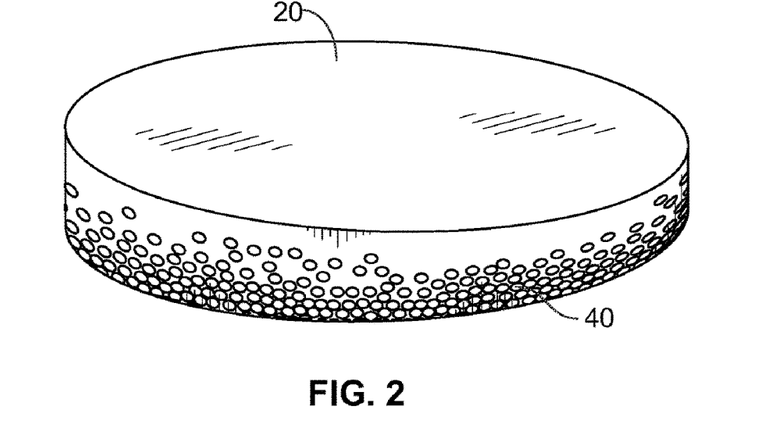
FIG. 2 is an isometric view of a pad showing particles embedded which is another embodiment of the invention.
Figure 3:
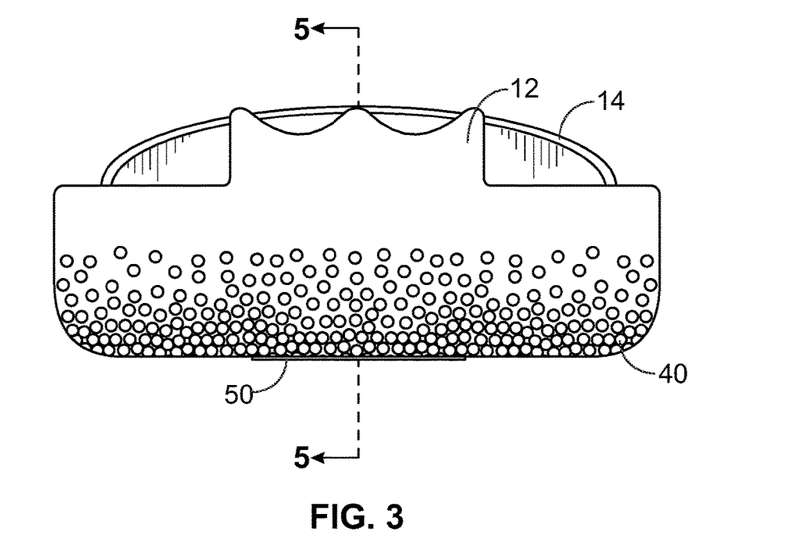
FIG. 3 is an end view of a pad showing particles embedded which is an embodiment of the invention.
Figure 4:
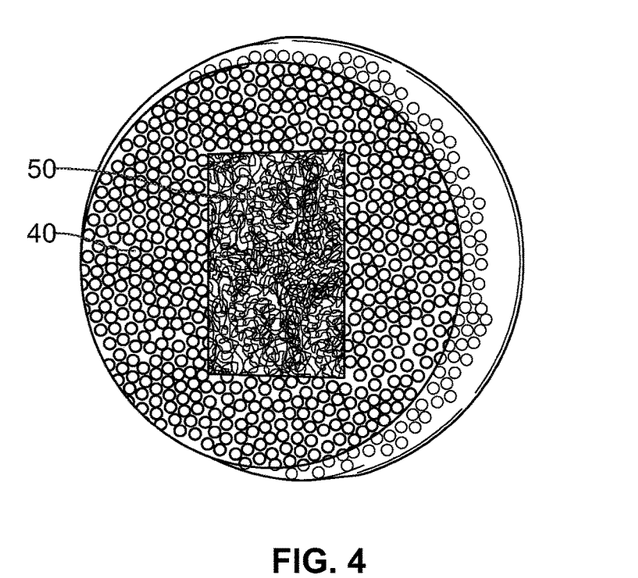
FIG. 4 is a bottom view of an elastomeric shock absorbing pad with particles embedded, showing a double-sided loop strap of a hook-and-loop type fastener attached.
Figure 5:
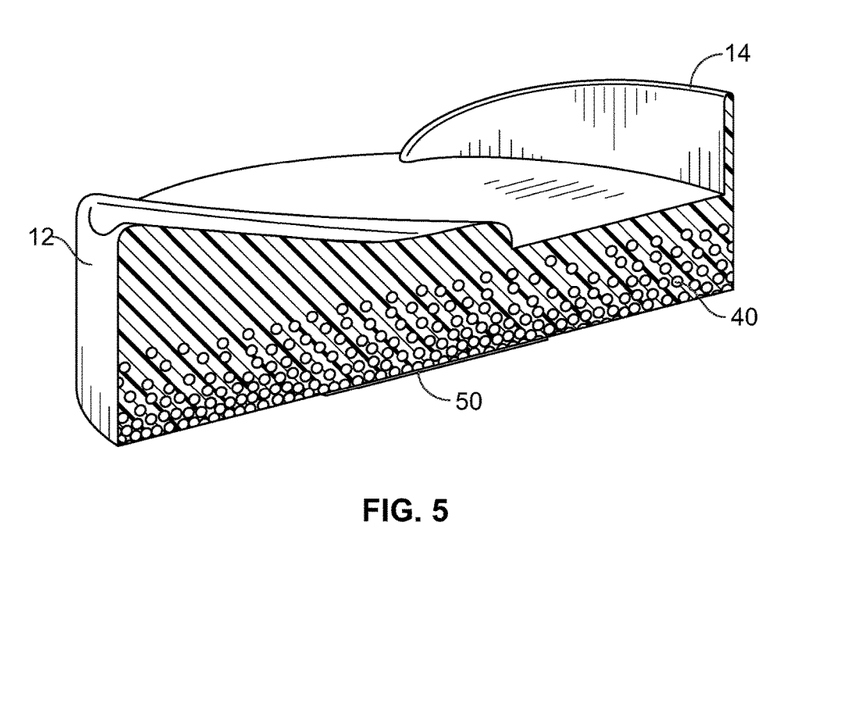
FIG. 5 is a sectional view of FIG. 3 of an elastomeric pad showing particles embedded and half a hook-and-loop fastener on the bottom of the pad that is an embodiment of the invention.
Figure 6:
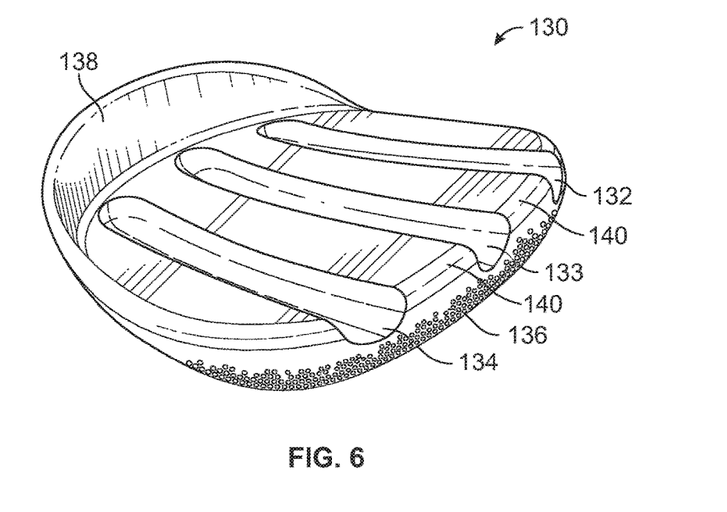
FIG. 6 is a perspective view of a ridged elastomeric orthotic pad of an embodiment of the invention.
Figure 7:
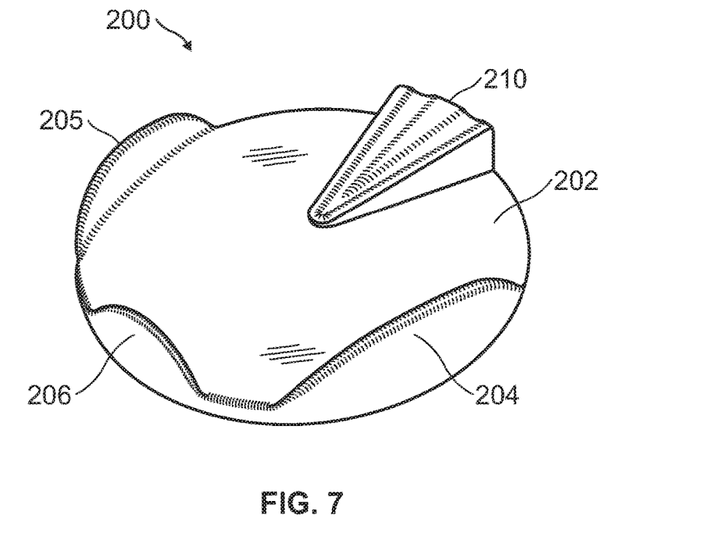
FIG. 7 is a perspective view of a toe clip elastomeric pad of an embodiment of the invention.
Figure 8:
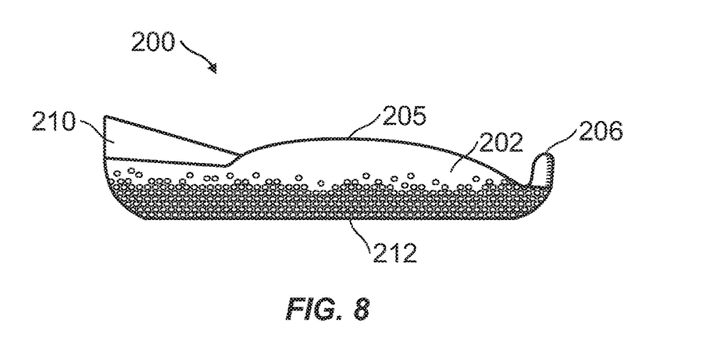
FIG. 8 is an elevation side view of the orthotic pad of FIG. 7.
Figure 9:
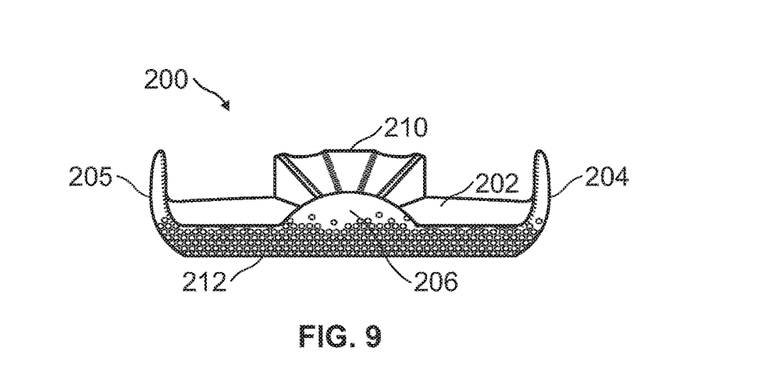
FIG. 9 is an elevation end view of the orthotic pad of FIG. 7.

Illustrations of embodiments of the invention are shown in FIGS. 1 and 2. FIG. 1 is an isometric view of an elastomeric shock-absorbing pad, 20, with expanded low density foam particles, 40, embedded. The particles, 40, are about three (3) mm diameter. This pad is similar to that of U.S. 2007/0107389 and has a front bumper 14 and frog support 12. While the bumper and frog support features are important for some applications, they are not a requirement for the present invention. FIG. 2 shows a pad, 20, without these features. FIG. 3 shows an end view of the pad of FIG. 1 and shows placement of one half of a double-sided loop strap of a hook-and-loop type fastener, 50, embedded in the bottom of the pad. FIG. 4 is a bottom view of the pad 10 of FIG. 1 and FIG. 3. FIG. 5 shows a cut-away view of the pad shown in FIG. 3. FIG. 6 illustrates a ridged orthotic pad particularly useful in icing boots. See U.S. Pat. No. 9,055,732, issued Jun. 16, 2015 and U.S. Pat. No. D746,519, issued Dec. 29, 2015. FIGS. 7-9 illustrate an orthotic pad having side toe clips and a front bumper. As illustrated in these Figures, it is preferred that the particles, 40, be concentrated in the lower ⅔ and preferable the lower ½ of the isomeric pad. FIG. 2 is a picture of a bottom view of an elastomeric shock-absorbing pad with expanded foam beads embedded.

As used herein, the term "spheroid" refers to particles with a generally elliptical shape, with a size large enough for individual particles to be visible to the human eye but small enough that they can be incorporated into an elastomeric matrix. Spheroid diameters generally fall in the range of forty (40) gm to two and fifty-four hundredths (2.54) cm ($1.6 \times 10^{-3}$ to 1 inch), with the preferred size for this invention described below. Although elliptical in shape, the particles' geometry may be somewhat irregular, and may include angular surfaces.

The Particles
Particle Materials

The particles may be constructed of any material with low density and low hardness for incorporation into a shock-absorbing elastomeric pad. Particle materials are of lower density than elastomeric polyurethane, capable of being adhered to by elastomeric polymer materials (preferably polyurethane), and preferably spherical or elliptical in shape. Suitable materials may include, but are not limited to expanded foam, polymers and elastomers or other cellular formulation of these polymers. Specific examples include, but are not limited to, expanded polystyrene foam (EPS), expanded polypropylene foam, polyethylene and expanded polyethylene (PE), high density polyethylene (HDPE), ethylene propylene diene monomer (EPDM), polystyrene (PS), polyurethane and polyurethane foams, polystyrene, polybutadiene, styrene-butadiene rubber (SBR), and polyvinyl chloride. In one embodiment, expanded polystyrene foam (EPS for its for its low density, flexibility, resilience, and thermal insulation. These foams, particularly EPS, are low density and pliable or elastic so they allow the elastomer to remain relatively soft. Harder particles lower the weight but in excess will make the pad harder than desired.

While particles of any shape will be suitable, particles of spheroidal shape are usually preferred and readily available commercially. Many of the suitable polymer particles will be available as very short cylinders, cubes, random-shaped particles and balls or spheroids. The generally spherical geometry of spheroids and the preferred size described hereafter, facilitates dispersion of the particles in elastomer. These properties allow addition of the particles to the liquid elastomer without substantially increasing viscosity of the mixture. In an especially preferred embodiment, the spheroid material described is expanded polystyrene foam beads and the elastomer is a polyurethane gel.

Geometry of Spheroidal Particles

The generally spherical shape of the spheroids is an important property for stability of the particles in the elastomer. For this invention, a useful property of the geometry is the minimization of outside angles of the particle (i.e. the more faces a polyhedron has, the smaller each outside angle is). The smaller the outside angles, the closer the object approximates an elliptical shape, and the more desirable the geometry is for the purpose of this invention).

The generally spherical shape of the spheroids maximizes the amount of elastomer dispersed between each spheroid by minimizing the surface area of contact between surrounding spheroids. This is important since it is undesirable for the particles to fuse together rather than be dispersed in the elastomer matrix as discrete particles.

In theory, there is an infinitesimally small surface area of contact between any adjacent, perfectly spherical particles. Practically, there will still be a relatively small area of contact, compared to the overall size of the particle, between adjacent particles, allowing elastomer to fill the spaces between the particles. Because the elastomer is the binding material that serves to bond the particles into the elastomer pad, maximizing the amount of elastomer between particles is desirable. The more polyhedral the shape—particularly a rectangular shape—the greater the increase in the surface area of contact between surrounding filler particles, thereby decreasing the amount of elastomer between adjacent particles and resulting in decreased particle stability in the pad.

Size of Particles

The particle cross section (or diameters) is desirably in the range of one (1) to six (6) mm ($3.9 \times 10^{-2}$ to $2.4 \times 10^{-1}$ inches). In a preferred embodiment, the particles have a cross section of approximately two (2) to four (4) mm ($7.9 \times 10^{-2}$ to $1.6 \times 10^{-1}$ inches), with approximately three (3) mm ($7.9 \times 10^{-2}$ inches) being particularly preferred. Particles of these sizes are small enough to be incorporated into the elastomer and large enough to avoid an undue increase of viscosity of the polymer mixture. If the particles are too large, the result is a kind of permanent set reducing the flexibility and compressibility of the gel and impairing the pumping action that comes from loading and unloading of the gel as the horse shifts its weight.

Density of Particles with Respect to the Elastomer Density and the Weight of Pad One of the key properties of the particles is their low density compared to the elastomer, resulting in a lower overall weight-to-volume ratio of the pad. This reduces the weight of the entire equine boot and pad assembly, addressing concerns relating to weight mentioned in the previous background discussion. The difference in density between the particles and the elastomer causes the particles to rise towards the top of a mold during casting, which becomes the bottom of the pad. More details of this process are discussed in the relevant section following. It is preferred that the elastomer be significantly denser than the particles. Because the particles are lower density than the elastomer, they rise in the mixture and accumulate in the top section of the mold, which is the bottom of the body of the pad. The body of the pad will then consist of a top layer comprised predominately of elastomer(s) that will be in contact with the hoof, and a bottom layer of particle-filled elastomer that provides a thermal barrier to protect the hoof from overheating while still providing deep-volume cushioning. It is obvious that in other embodiments, the relative densities of the particles and elastomer(s) may be varied to control the relative positions of elastomer and particles.

The density of the dispersed particles is desirably in the range of about ten (10) to two hundred (200) grams/liter (g/l). For example, expanded EPS beads have a density range of about ten to two hundred (10-46) gm/liter, and the preferred mid-density beads have a density range of from about forty to one hundred twenty (40-120) gm/liter. One preferred elastomer for the pads, having a shore A hardness in the range of eighteen to twenty-two (18-22), has a density of about one thousand twenty-five to one thousand seventy (1025-1070) gm/liter, so the ratio of density of elastomer to particle will be in the range of from about eight to one hundred seven (8-107). It is suitable that the particles be at least half the density of the elastomer and preferably no more than about 30% as dense and preferable no more than about 15%.

Example of a Pad of the Invention

A polyurethane elastomer pad having a Shore A hardness of about twenty (20) was prepared as described below with about thirty-four (34) percent expanded polypropylene spheroids. The resulting elastomeric pad had about thirty-four (34) percent reduction in weight, no appreciable increase in hardness, and no loss in ability to attach a loop-and-hook, double-sided hook strap to the elastomer as it was curing. Loss of ability could result if too many particles were located at the bottom of the pad. The spheroid particles have so little weight (density) that they produce a weight reduction approximate to their volume percentage in the mix with the heavier polyurethane matrix.

In embodiments where polyurethane gel pads are filled with expanded polymer foam particles, the volume percentage of particles to elastomer will be in the range of ten to forty-five (10-45) percent, with a preferred range of about twenty to forty (20-40) percent, and a more preferred range of about thirty to forty (30-40) percent. Since the particles are much harder than the elastomer, too high a concentration would result in loss of "softness" of the elastomeric gel and defeat the benefits of the soft gel as a shock-absorbing pad. Moreover, too high a concentration of particles would unacceptably reduce the integrity of the elastomer.

Thermally Insulative Property of Particles

In general, the particles described are comprised of material(s) with thermally insulative properties. Polymer foams such as expanded polystyrene foams are good insulators because of the large amount of void space in the foam. This insulative property is especially desirable to shield the equine hoof from excessive heat transfer from high temperature roadways during transport and hot surfaces of stalls, roadway and arenas where horses must stand for any significant period of time.

Multiple Types of Particles

Multiple types of particles may be used, differing in composition, size, etc. These different particles may be dispersed into approximately distinct regions of the pad, or may be mixed together. This may be desirable in order to achieve certain weight, thermal insulation, durability, support and cushioning properties of the pad. The important property is that they be encased, immovably, in the elastomer. It should be understood that "immovable" and "immovability" as the term is used herein and in the claims, means that the particles are fixed in respect to the cured elastomer surrounding them. If the elastomer is flexed, compressed or expanded, the particles may move in respect to a given location in space but will not be able to migrate within the elastomer matrix. Loose particles that can move relative to each other are unsuitable for the orthotic pads of this invention.

The Process

In broad aspect, the method for manufacturing the improved pads comprises mixing foam particles with one or more elastomer components during curing to form a molded flexible, shock absorbing pad. In a preferred embodiment, the elastomer is polyurethane, as described in the previously incorporated references, and the particles are low density, thermally insulative, elastic material. The resulting gel orthotic pad is lighter weight and more thermally insulative compared to a pad solely made of polymer material such as polyurethane gel, while retaining the deep, cushioning support of the equine hoof. In general, the basic process is to mix the elastomer components and catalysts, and to disperse the particles in the unset elastomer during curing while the elastomer is still substantially in the liquid state. A mold of the desired size and shape is filled with the resulting mixture and the mixture is allowed to set and cure.

In a preferred embodiment, the method comprises mixing the elastomer components with particles (beads) before curing of the elastomer is complete to form a homogeneous suspension. This mixture is poured into an open mold in which the open top of the mold is the bottom of the boot. The spheroids will tend to rise to the top of the mold, accumulating in the upper portion of the pad. Once the elastomer is properly cured, the pad is removed from the mold. The resulting pad is comprised of a layer of elastomer in the upper portion of the pad suitable for exposure to the abrasive horse hoof or shoe, and a layer of elastomer-bound spheroids in the lower portion of the pad suitable for thermally insulating the hoof from the ground, absorbing shock, and reducing the overall weight of the pad. A middle layer is comprised of an increasing concentration of spheroids dispersed in elastomer as one progresses from the top of the pad towards the bottom. It is preferred that the projections (clips, bumper and frog support) not have particles dispersed therein. This is easily accomplished in an open mold by pouring the projection first (the mold for these is located on the lower sections of an open mold) letting the polymer partially set then pouring the body of the pad with mixed particle as described above. This method place the particle in the lower section of the body of the pad and leaves the clips, bumper and frog support with polymer only without particles dispersed.

Variables for Control of Travel Rate of Particles

The rate at which the particles travel through the liquid elastomer to accumulate at the top of the curing part (which will be the bottom of the finished pad) may be controlled by the curing rate. This rate is affected by three main variables: 1) the amount of catalyst used in formulating the elastomer, 2) the duration of mixing of the elastomer and/or the particle-and-elastomer mixture, and 3) the temperature of the elastomer components before mixing. Controlling travel rate of the particles will control the depth of dispersal of the particles through the finished pad.

Attachment of Hook-and-Loop Type Fastener System

When an animal turns its hoof while wearing the pad and boot assembly described above, the pad tends to rotate within the boot. Therefore, while the pad should be easily removable from the boot, it should also be securely attached inside the boot to resist the significant rotational torque applied to the junction between the pad and the boot. In a current commercial embodiment of the pad and boot assembly, a double-sided Velcro®-type hook-and-loop tape is secured to the bottom of the pad for use in attaching the pad inside the boot. Secure attachment of the hook-and-loop tape to elastomer material of the pad is necessary because of the mechanical mismatch between highly elastic elastomer and the non-elastic hook-and-loop tape. The present method of adding particles allows this hook-and-loop tape to be secured to the bottom of a pad manufactured from elastomer without interfering with the method of securing the hook and loop part to the elastomeric pad.

In one embodiment of the process, particles are initially dispersed evenly throughout a liquid elastomer as described previously. This procedure allows the hook-and-loop tape to bind to the elastomer before the particles rise to the top of the mold, which is the bottom of the pad. As the particles rise, they collect around the hook-and-loop tape, but do not accumulate to any significant extent underneath the tape. Were the elastomer/particle filled pad allowed to cure before attaching the hook and loop tape, it would not be possible to adequately secure the tape to the pad and some less convenient and less adequate means of securing the pad and boot would be required. Thus, the hook-and-loop tape is attached more securely to the bottom of the pad than it would be if it were applied after the pad was formed.

The Pad

In broad aspect, the pads of this invention are a reduced weight version of those orthotic pads described in U.S. Pat. No. 7,445,051, issued Nov. 4, 2008 and patent publications U.S. 2007/0107389, published May 17, 2007 and U.S. 2009/0032270, published Feb. 5, 2009 and are formed by the dispersion of small, low density particles in the base elastomer(s). The disclosures and Figures of this patent and applications are incorporated herein by reference.

The pads can be made of any suitable elastomeric polymer material that provides flexibility, shock absorbency, some degree of elasticity, resilience, and dimensional stability. Polyurethane polymer gel is preferred. Polyvinyl chloride (PVC), polysilicone, and similar elastomers, well known to those in the art, are also suitable. In a preferred embodiment, the base is constructed of a cast polyurethane elastomer. For example, polyurethane casting elastomer having a Shore A hardness of from about ten (10) to about seventy (70) is suitable with about eight (8) to fifty (50) Shore A hardness preferred. In some situations, very soft pads are desirable. These will generally be thicker than harder pads, and will have a Shore 00 hardness of about five (5) to seventy (70). It is preferred that the material for the pads of this invention have low rebound resiliency, generally lower that twenty-five (25) percent and preferably between two (2) and ten (10) percent. These elastomeric pads are sometimes referred to herein as "gel" or "gel pads" and as "orthotics".

Geometry of Pad

The base of the shock-absorbing orthotic pad is generally shaped to both approximate the shape of the animal's hoof-print and fit into the boot. It has been found that the shape of the pad is important. Completely round pads do not to perform well in actual use, as they tend to rotate in the boot. An elliptically shaped pad is desirable to maintain consistent fit and to prevent rotation of the pad in use. The shape will depend on the nature of the hooves; for example, Arabian horses generally have more elongated hooves than do Quarter horses. Moreover, more elongated oval shapes are especially useful in laminitis-affected horses, where the hoof is tilted downward because of the abnormal growth rates of the hoof walls caused by the compromised tubules of the laminae. Therefore, in one embodiment, the pad is elliptically shaped. See the above referenced patent and applications.

Triangular and Front Projections

In one embodiment, on the backside of the base, opposite the ridge, is a truncated frog support (see element 12 of FIGS. 1, 3 and 5). This is a triangular projection above the surface of the base. This triangular projection is designed to approximately correspond to the shape and location of the frog of a horse's hoof and contact the frog during use, providing a kind of massage to the frog of the hoof. Thus, blood circulation is stimulated and stress on the animal's legs and tendons is relieved. In another embodiment, a front support provides cushioning to the toe of the hoof—element 14 of FIGS. 1, 3 and 5. For pads with the frog support it is preferred that it not be filled with low density particles.

In some embodiments, the pad will not have the triangular projection or the front projection—see FIG. 2. For example, when used with a horse that has an abscessed or injured frog, it may be desirable to use a pad without the frog support. However, even without the frog support, the front ridge projection is often useful, especially for a horse with a severely injured or damaged hoof. At times, it is necessary to resection (remove the front hard hoof surface) a horse's hoof if it is damaged or diseased. Such is the case with advanced laminitis. In these cases, the soft front support ridge provides extra comfort to the hoof, especially if the pad is wedge-shaped (sloped) in a way that forces the front of the hoof downward.

Pad Base

The pad base bears the burden of supplying the bulk of the support for the animal. The frog support is an aid to stimulation of the frog and is not the principal means of supporting the hoof. In this way, the present invention differs from previous frog support shoes or pads that allow the hoof wall to move. An advantage of the relatively large and soft pad (Deep Gel™) is that it enables the horse to adjust the position of its hoof to the most comfortable position. The relatively large depth and volume of the pad is important to its success as a therapeutic tool to support the sole and the hoof. Support of the rear of the hoof reduces the pull of the deep flexor tendon on the coffin bone in tendonitis, and serves to reduce pain and provide support for healing of the lamina. The raised angle of the rear portion of the pad combined with the gel redistribution with movement of the hoof allows the horse to adjust its stance, reducing the pull on the deep flexor tendon.

FIG. 6 illustrates a ridged pad, 130, especially useful for icing boots as they allow coolant circulation beneath the hoof. It has grooves 132, 133 and 134, ridges 140, a body 136 and front toe bumper 138. As in the pads described below it is preferred that the low density particles not be include in the ridges 140.

FIGS. 7-9 are a perspective, and front view of an elastomeric shock adsorbing pad (orthotic pad), 200, having a body 202, side clips 204 and 205 and a toe bumper 206. This configuration can be especially useful for the more elongated (oval shaped) hooves. The separation of the side clips and toe bumper (204, 205 and 206 in FIGS. 7-9) help stabilize the hoof in the boot and being smaller, do not tend to distort as would the pads with a full front bumper (as the pads described above). They help to conform to the elastomer pad around the hoof even if the hoof is not completely symmetrical. The anatomically shaped boot (follows angle of hoof) pushes the gel into the hoof wall there by further stabilizes the boot and gel orthotic on the hoof. The side clips and toe bumper are shorter and thinner than previously described orthotic pads. The pad is also lighter. The side clips help to stabilize a hoof in a boot and the toe bumper aids in preventing the hoof from tearing or excessively wearing the boot fabric in the inside front of the boot. The shorter clips and bumper fit more easily in the boots as described above and do not distort in use. A triangular frog support 210 is optional. It aids in pumping blood to the leg as described above, but many farriers prefer to pack the hooves with fillers and do not want the frog support. For these pads and others, it is preferred that beads not be included in the side clips and bumper.

Pad Material

The elastomeric portion of the pad can be made of any suitable elastomeric material that provides flexibility, shock absorbency, some degree of elasticity, resilience, and dimensional stability. Polyurethane gel elastomers are especially suitable. Polyvinyl chloride (PVC), polysilicone, and similar elastomers, well known to those in the art, are also suitable. Unlike the spheroid materials, however, foams and other materials with little resistance to abrasion are unsuitable, due to the abrasion the material must endure from contact with the hoof. Non-elastomeric materials are generally unsuitable because they do not provide sufficient cushioning for the hoof.

In a preferred embodiment, the elastomeric shock-absorbing pad is constructed of a cast polyurethane elastomer. For example, polyurethane casting elastomer having a Shore A hardness of from about eight (8) to about seventy (70) is suitable. In some situations, very soft pads are desirable. These will generally be thicker than harder pads, and will have a Shore 00 hardness of about five (5) to seventy (70). It is preferred that the material for the pads of this invention have low rebound resiliency, generally lower that twenty-five (25) percent and preferably between two (2) and ten (10) percent.

In another embodiment, the pads may be comprised of multiple elastomer materials such that one region of the pad is made up of one type of elastomeric material and transitions into one or more other regions comprised of different elastomer materials. This may be desirable, for instance, in a dual density orthotic pad designed so that the rear of the hoof is on a harder material than the toe, elevating the heel and allowing the toe to sink deeper into the cushioning pad and creating a wedge-shaped support for the hoof, altering the resting position of the hoof. Particles will be in at least one of these regions, as desired to balance durability, weight, thermal insulative properties, hardness, and support. These elastomeric pads are sometimes referred to herein as "pads," "gel pads," "shock absorbing pads," and "orthotic pads."

The Boot

In broad aspect the boot of the present invention comprises an upper portion made from flexible material shaped to fit the hoof of an animal and of a height to reach above the hoof of the animal for which it is designed. The boot has a front, sides, rear and bottom; the front slopes back and upward, the sides are lower than the front and rear so that when the front and rear are pulled together there is an opening in the sides. There is a fastening means at the top front and rear to fasten the front and rear together around the leg of an equine. In one embodiment the fastening means are straps that slop diagonally from top toward the bottom of the boot. The bottom is attached to a sole plate comprising a molded elastomer base entirely circumscribed by a peripheral wall (or sides) defining a receiving area sized to fit over the bottom of the upper portion; said sole plate being securely attached to the lower circumference of the upper portion. In one embodiment of this invention in which deep soft pads are used for therapeutic effect, even though it is not necessary that the sole plate be located outside the fabric boot, it is especially important that the bottom circumference of the boot be sufficiently strong to contain the soft pad when it is squeezed outwardly by the pressure of the equine's hoof.

Figure 10:
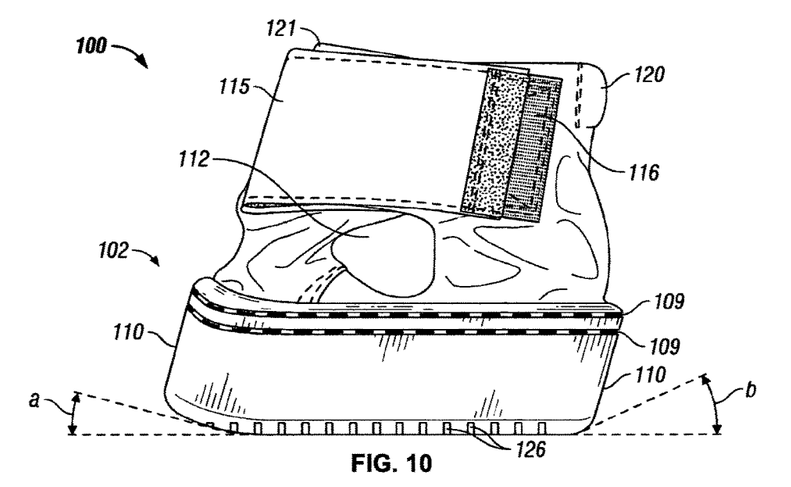
FIG. 10 is a side view of a boot of the present invention.
Figure 11:
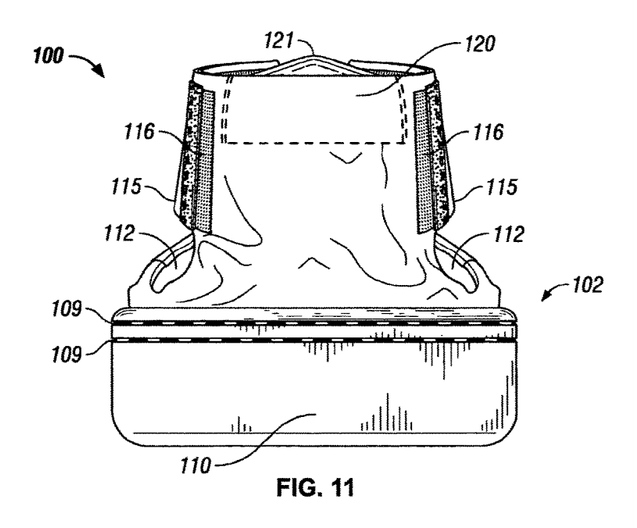
FIG. 11 is a rear view of a boot of the present invention.
Figure 12:
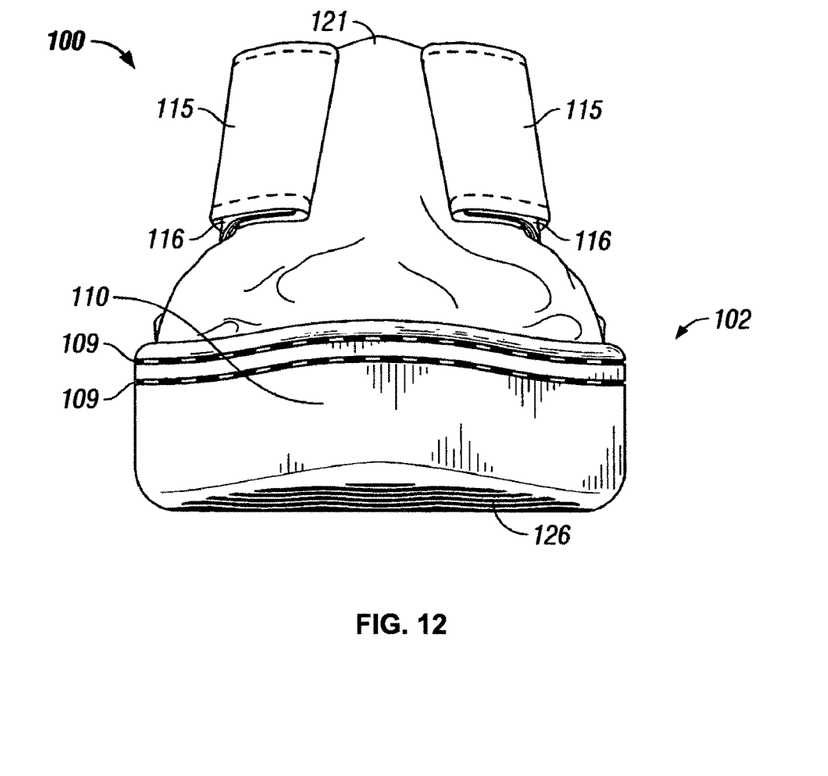
FIG. 12 is a front view of a boot of the present invention.

The boot is shaped to fit snugly on the hoof of an animal when fastened. FIGS. 10-12 depict an embodiment of the invention. As seen in FIG. 10, the boot slopes from bottom to top on the front to correspond to the slope of the animal's hoof. The angle of the slope is between 20 to 50 degrees. Preferably the angle is from 30 to 50 degrees and a 45 degree angle has been found very suitable.

The boot consists of a body, side openings (112) and closure straps (115) and (116) and sole plate (110). The size of the boot will vary according to the size of the hoof of animal on which it will be used. Generally, for horses, the boot will be sized to accommodate a four (4) to nine (9) inch diameter pad, about four (4) to ten (10) inches from front to rear. The height from sole to the top will be sufficient to clear the hoof so the boot top may be secured around the leg above the coronary band and the bulbs of the heel of the animal. The boots are from about three (3) to eight (8) inches in height. In one embodiment the rear side of the boot will be 4.5 to six (6) inches from the top to the bottom of the sole plate with the front side slightly longer (to account for the slope of the front side). There are openings (112) along each side of the boot to allow it to be opened for placing on the animal's hoof. Large openings allow the boot to be easily fitted on a horse's hoof and provide ventilation for the hoof and lower leg. These opening also allow access to the hoof for treatment. The distance of the openings from the sole will be sufficient to cover the shock-absorbing pad described below and the length of the slit will be sufficient to allow the boot to be opened to easily slip onto the hoof. For horse boots, the opening (112) on the sides will ideally start about two (2) to three (3) inches from the sole and be about three (3) to five (5) inches in width. The openings in a preferred embodiment are generally centered approximately about 90° from a point in the exact center of the front of the boot. It is preferred that the openings be at least about ¾ to 1½ inches in diameter (recognizing that the opening are not necessarily completely round) when the boot is securely strapped on the hoof of a horse. See FIGS. 10 and 11 where the opening 112 is shown with the boot closed, as around the hoof of a horse.

In another preferred embodiment, the rear of the boot—the side opposite the sloped front—is completely covered with fabric, e.g. there are no openings in the rear of the boot from the rear of one side opening to the rear of the opposite side opening. The rear of the opening is the side away from the sloping front of the boot. This can be especially important to protect the rear of the horse's ankle and to prevent movement of a pad placed into the boot (described below).

The top of the boot is enclosed around the leg of a horse by fastening means. Suitable attaching means include straps, illustrated by 115 and 116 of FIGS. 10-12, that operate by connecting the straps 115 and 116 so that the opening fits snugly around the leg of the animal. The straps consist of a first set of straps attached to the rear top of the boot that are attachable to a second set of straps attached to the front top side of the boot by any convenient means. In this overlap strap arrangement, the first strap 115 is secured to the fabric at the front of the boot overlapping strap 116 attached to the rear fabric of the boot. The attachment overlaps the front straps over the rear straps to secure the rear strap top and bottom. This gives a secure and reliable closure. In one embodiment the straps will slope downward making a V shape in the front of the boot. A suitable fastening means is for the strap attached to the front having attached to both sides one half of a loop and hook connector (for example, Velcro®) and a strap attached on the rear having connected to both sides thereto the other half of a hook and loop connector. The strap is from about one half to three (3) inches in length. The straps may also be buttoned, snapped or tied, but preferable are attached by hook and loop straps (for example Velcro®). The strap attached to the back of the boot, in one embodiment, will have an elastic strip attached to the unattached open end so that the strap may be better tightened and adjusted. Referring to FIGS. 10 and 11, the strap 115 will have an elastic portion on the unattached end. The elastic strap will comprise about 10% to 60% of the length of the strap.

The boot is made of any suitable flexible material, such as leather, woven or non-woven fabric or plastic sheet or mold. It has been found desirable to use a double layer of fabric, but this is not essential. A particularly suitable fabric is an 18 oz. Ballistic cloth used by the U.S. military for bags. A DuPont nylon woven fabric, CORDURA®, available in several weights, may be used. The 330 denier fabric is preferred.

When made of fabric the upper boot will have sides with a fabric bottom attached to the sides by stitching. The stitching area may make a sizable ring of material at the bottom circumference of the fabric upper boot—this is easily accommodated in the present invention by a groove in the sole plate.

In one embodiment there is a strip of hook and loop fastener attached to the top side of the bottom fabric of the upper fabric boot. This strip is positioned to mate with a matching strip of hook and loop fastener on the bottom side of a shock absorbing pad. When assembled the two sides of the hook and loop fasteners connect to secure the pad to the bottom of the fabric boot to prevent rotation of the pad during use. The hoof of a horse on which the boot is fitted exerts tremendous pressure and turning torque on the pad. The hook and loop attachment prevents the pad from rotating. The strips are from 0.5 to four (4) inches in length and from 0.5 to 2.5 inches in width. The matching hook and loop fastener on the pad is secured to the pad as described below.

It is preferred that the front and rear tops of the boot at points (120) and (121) be padded. The padding is constructed by enclosing a polymeric foam, closed cell rubber pad, or other suitable resilient material, inside a pouch of fabric at the top front and rear of the boot. A round section of polymer foam padding is very suitable. Such padding may be the kind used in door insulation or expansion joints for concrete driveways or sidewalks. Any polymer foam is suitable as is cotton or synthetic fiber padding. This padding allows a closer and more secure fit around the animal's leg. The rear pad should be above the bulbs of the hoof so that the boot does not rotate. A round foam pad of about 1 inch in diameter is generally ideal. Padding of 0.5 to about 1.5 inches is desired. The padding is about one (1) to 2.5 inches in length. The padding in the rear of the boot is a single pad (120) whereas the padding in the front (121) is separated by stitching; each side being about one (1) to 2.5 inches in length.

The sole plate 110 in FIGS. 10-12 is of special importance. The sole plate is a separate molded piece and is attached to the bottom of the fabric upper. The sole plate consists of a bottom plate and walls or sides that extend upward and entirely around the circumference of the sole plate. See FIGS. 10-12. The sole plate helps to hold the boot in position on the hoof, and if walled around the entire circumference it prevents the hoof sliding forward or rearward while in use. Moreover, the sole plate is important in confining an elastomeric pad in place. If a relatively "soft" pad is used (as is often desirable) the weight of the horse will flatten the pad and, if there were an opening in the sole plate the pad would be extruded out the opening. By having the sole plate wall entirely surrounding the circumstance the pad is held in place and will conform to the shape of the hoof—and adapt to the shape of the hoof as the horse moves. This allows the horse to find the best natural balance position-similar to the effect of having the horse stand in loose sand. The ability to achieve natural balance is especially important for horses with injured or diseased hoofs. This entire boot wall also prevents dirt and other matter getting into the bottom of the boot. The sole plate bottom is preferably about 0.375 inches to 0.65 inches thick, but may be from 0.2 to 0.75 inches in thickness. The sole plate wall (110) will extend upward 1.5 to 2.25 inches in the rear wall and 1.75 to 3 inches in the front wall about 0.75 inches to about 2.25 inches, measured from the bottom of the sole plate surface.

The sole plate is preferably molded of polymeric elastomer material or hard rubber (having the consistency and hardness to approximate automobile tires). Thermoplastic polyurethanes (TPUs) are suitable materials for the base plate. It is preferred that thermoplastic polyurethanes of about 55 to 75 Shore A hardness be used, with Shore A hardness of 65 to 70 being especially suitable. Other polymer materials with similar characteristics as thermoplastic polyurethanes are also usable. Choice of these will be well within the ability of those skilled in the polymer art to select.

The sole plate is attached to the bottom of the fabric boot. The attachment is preferably accomplished by either an adhesive and/or mechanical means, for example, the may be first attached by a suitable adhesive then sewn to the lower portion of the cloth boot. It has been found that two rows of stitching is especially preferred to prevent the sole from coming detached from the fabric upper during use. A double row of stitching is indicated in FIGS. 10-12 (109). Generally the sole plate will be outside the fabric boot but may in special circumstances be inside.

It is also desirable that the sole plate have a groove in the inside bottom. This groove allows a recess space for the seam in the bottom of the upper fabric boot. The depth of this groove will depend on the size of the seam of material in the cloth upper of the boot but generally will be about 0.25 inches.

In a preferred embodiment the bottom of the sole plate is sloped upward in the front at an angle (a in FIG. 10) of about five (5) to thirty (30) degrees from the bottom plane as shown in FIGS. 10 and 12. The slope begins at a point on the bottom of the sole plate twenty (20) to forty (40) percent of the length from front to rear of the sole plate. The point of beginning is preferably about ⅓ of the distance from the front of the length of the sole plate. The edges of the sole may also be rounded as shown by angle b in FIG. 10. This angled sole plate allows the horse hoof to rock forward and backward without undue pressure on the hoof. When the horse walks the boot will "break-over" in a natural way, preventing abnormal pressure on the hoof. This rocker effect is well recognized as beneficial and there are a number of commercial products, such as the "clog" and other devises designed to "rock" with the shift in body weight of the horse allowing it to achieve a "natural balance". This can be especially important for houses with sore or damaged hoofs.

The sole plate is preferably patterned, i.e. cleated or ridged, on the bottom. A suitable cleated design is shown in U.S. Pat. No. 7,178,321, the relevant disclosure of which is herein incorporated by reference. A very suitable patterned design for the bottom of the sole plate is shown in U.S. Design patent application No. 29/266,935, filed Oct. 2, 2006, the disclosure of which is herein incorporated by reference. This design allows for excellent traction by slanted ridges (126) on the front and rear of the sole and more flexibility in the center of the sole under the section of the boot where the frog of the hoof is placed. This flexibility provides more comfort for a horse with an injured or diseased hoof. Other designs and cleat arrangement will be well within the skill on those in the art.

SCOPE OF THE INVENTION

In this specification and Figures, the invention has been described with reference to specific embodiments. It will be evident, however, that various modifications and changes can be made thereto without departing from the broader spirit and scope of the invention as set forth in the appended claims. The specification is, accordingly to be regarded as illustrative rather than restrictive. Therefore, the scope of the invention is limited only by the appended claims.

The invention claimed is:

1. An orthotic pad for use in an equine boot comprising a solid elastomer orthotic pad having a hardness no greater than 70 Shore A and having expanded foam polymer particles dispersed therein, wherein the particles are of lower density than the solid elastomer and are immovably encased in the solid elastomer, wherein the orthotic pad has an upper portion above a centerline of the orthotic pad and a lower portion below a centerline of the orthotic pad, and wherein the lower portion of the orthotic pad has a greater concentration of particles dispersed in the solid elastomer.

2. The orthotic pad of claim 1 wherein the orthotic pad has a top and a bottom and is elliptically shaped when viewed from the top or bottom.

3. The orthotic pad of claim 1 wherein the elastomer orthotic pad has a top side, underside, sides, front and rear and wherein it has projections extending from the top side selected from the group consisting of, a triangular shaped frog support on the top rear, curved clips on the sides and a curved toe bumper on the front.

4. The orthotic pad of claim 3 wherein the projections extending from the top side have no expanded foam polymer particles dispersed therein.

5. The orthotic pad of claim 1 wherein the elastomer orthotic pad is shaped in the form of an equine hoof, has a top side, underside, sides, front and rear and is ridged.

6. The orthotic pad of claim 1 wherein the particles are comprised of polymers selected from the group consisting of: expanded polystyrene foam (EPS), expanded polypropylene foam, and expanded foams of polyethylene and expanded foams of polyethylene (PE), high density polyethylene (HDPE), ethylene propylene diene monomer (EPDM), polystyrene (PS), polyurethane and polyurethane foams, polystyrene, polybutadiene, styrene-butadiene rubber (SBR), and polyvinyl chloride.

7. The orthotic pad of claim 1 wherein the orthotic pad is comprised of multiple, distinct regions formed of differing elastomeric materials, and at least one region that contains expanded foam polymer particles.

8. The orthotic pad of claim 1, wherein the orthotic pad is comprised of more than one type of expanded foam polymer particles dispersed therein.

9. The orthotic pad of claim 1, wherein the particles are comprised of expanded polystyrene foam and wherein the orthotic pad is made of polyurethane gel.

10. The orthotic pad of claim 1, wherein the orthotic pad is comprised of material having a rebound resiliency lower than twenty-five (25) percent.

11. An orthotic pad for use in an equine boot comprising a solid elastomer orthotic pad having a hardness no greater than 70 Shore A and having expanded foam polymer particles dispersed therein, wherein the particles are of lower density than the solid elastomer and are immovably encased in the elastomer, wherein the particles have a density no greater than 30% of the density of the material of the solid elastomer of the orthotic pad and are more heat insulative than the elastomer, and wherein a greater concentration of particles are dispersed in the elastomer in a lower portion of the orthotic pad, the lower portion being below a centerline of the orthotic pad.

12. The orthotic pad of claim 11, wherein the particles are comprised of expanded polystyrene foam and wherein the orthotic pad is made of polyurethane gel.

13. The orthotic pad of claim 11 wherein the orthotic pad is comprised of multiple, distinct regions formed of differing elastomeric materials, and at least one region that contains expanded foam polymer particles.

14. The orthotic pad of claim 11, wherein the orthotic pad is comprised of more than one type of expanded foam polymer particles dispersed therein.

15. The orthotic pad of claim 11, wherein the orthotic pad is comprised of material having a rebound resiliency lower than twenty-five (25) percent.

16. An equine boot assembly comprising;
an equine boot comprising an upper section made from flexible material, shaped to fit around the hoof of a horse and of a height to reach above the hoof of the horse, having a front, sides, and rear, a fastening means to fasten the front and rear together around the leg of a horse, and a bottom section, made of an elastomer attached to the upper section, of sufficient height and strength to constrain the deformation of a cushioning pad placed therein and compressed by the weight of a horse's hoof; and an elastomer orthotic pad disposed in the bottom section of the equine boot,
wherein the elastomer orthotic pad comprises a solid elastomer body having a hardness no greater than 70 Shore A and having discrete expanded foam polymer particles dispersed therein, wherein the discrete particles are of lower density than the solid elastomer of the solid elastomer body, and are immovably encased therein, wherein the orthotic pad has an upper portion above a centerline of the elastomer orthotic pad and a lower portion below a centerline of the elastomer orthotic pad, and wherein the lower portion of the elastomer orthotic pad has a greater concentration of particles dispersed in the solid elastomer body.

17. The equine boot assembly of claim 16 wherein the elastomer orthotic pad has a top side, bottom, top front and top rear and is ridged on the top side or has a front bumper projection on the top front and two separate side clip projections on the top side.

* * * * *